United States Patent
Nicolas et al.

(10) Patent No.: US 8,660,715 B2
(45) Date of Patent: Feb. 25, 2014

(54) METHOD AND DEVICE FOR AUTOMATICALLY MONITORING AIR OPERATIONS REQUIRING NAVIGATION AND GUIDANCE PERFORMANCE

(75) Inventors: Arnaud Nicolas, Toulouse (FR); Sylvain Raynaud, Cornebarrieu (FR); Florent Lanterna, Toulouse (FR); Martin Legay, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 115 days.

(21) Appl. No.: 13/342,611

(22) Filed: Jan. 3, 2012
(Under 37 CFR 1.47)

(65) Prior Publication Data

US 2012/0173052 A1  Jul. 5, 2012

(30) Foreign Application Priority Data

Jan. 5, 2011  (FR) ..................... 11 50073

(51) Int. Cl.
*G05D 3/00* (2006.01)
*G06F 17/00* (2006.01)
*G01C 23/00* (2006.01)

(52) U.S. Cl.
USPC .......................................................... 701/3

(58) Field of Classification Search
USPC .......................................................... 701/3
See application file for complete search history.

(56) References Cited

U.S. PATENT DOCUMENTS

| | | | | |
|---|---|---|---|---|
| 3,665,173 A | * | 5/1972 | Bouricius et al. ............... | 714/11 |
| 6,059,225 A | * | 5/2000 | Vidal et al. .................. | 244/17.13 |
| 6,377,892 B1 | * | 4/2002 | Johnson et al. ............... | 701/470 |
| 7,690,603 B2 | * | 4/2010 | Peyrucain et al. ............ | 244/183 |
| 7,899,585 B2 | * | 3/2011 | Rouquette et al. ................ | 701/9 |
| 8,090,483 B2 | * | 1/2012 | Pepitone et al. .................... | 701/3 |
| 8,121,747 B2 | * | 2/2012 | Loots et al. ..................... | 701/16 |
| 8,244,414 B2 | * | 8/2012 | Fok et al. .......................... | 701/3 |
| 8,244,467 B2 | * | 8/2012 | Huynh et al. .................. | 701/468 |
| 2001/0052562 A1 | * | 12/2001 | Ishihara et al. ................ | 244/175 |
| 2006/0167619 A1 | * | 7/2006 | Arethens ........................ | 701/120 |
| 2006/0287809 A1 | * | 12/2006 | Lebrun .......................... | 701/200 |
| 2007/0299568 A1 | * | 12/2007 | Rouquette et al. ................ | 701/3 |
| 2009/0112464 A1 | | 4/2009 | Belcher | |
| 2012/0092193 A1 | * | 4/2012 | Perrie et al. .................... | 340/979 |
| 2012/0150366 A1 | * | 6/2012 | Potagnik et al. .................. | 701/3 |

FOREIGN PATENT DOCUMENTS

| EP | 2216244 | 8/2010 |
|---|---|---|
| FR | 2901893 | 12/2007 |
| FR | 2939528 | 6/2010 |

OTHER PUBLICATIONS

French Patent Office, French Search Report FR 1150073, Oct. 17, 2011 (2 pgs).

* cited by examiner

*Primary Examiner* — Mary Cheung
*Assistant Examiner* — Frederick Bushaber
(74) *Attorney, Agent, or Firm* — Wood, Herron & Evans, LLP

(57) ABSTRACT

A monitoring device includes one or more devices for implementing monitoring, in order to check whether two flight management systems are able to operate in dual mode during operations requiring navigation and guidance performance. For example, a change condition verification device may be included in a second or slave flight management system so that sequencing requests and resynchronization requests received from a first or master flight management system are verified for accuracy before implementation. The verification may include comparison of positional data used by the first and second flight management systems or a comparison of a resynchronized flight plan to information from a navigation data database.

20 Claims, 1 Drawing Sheet

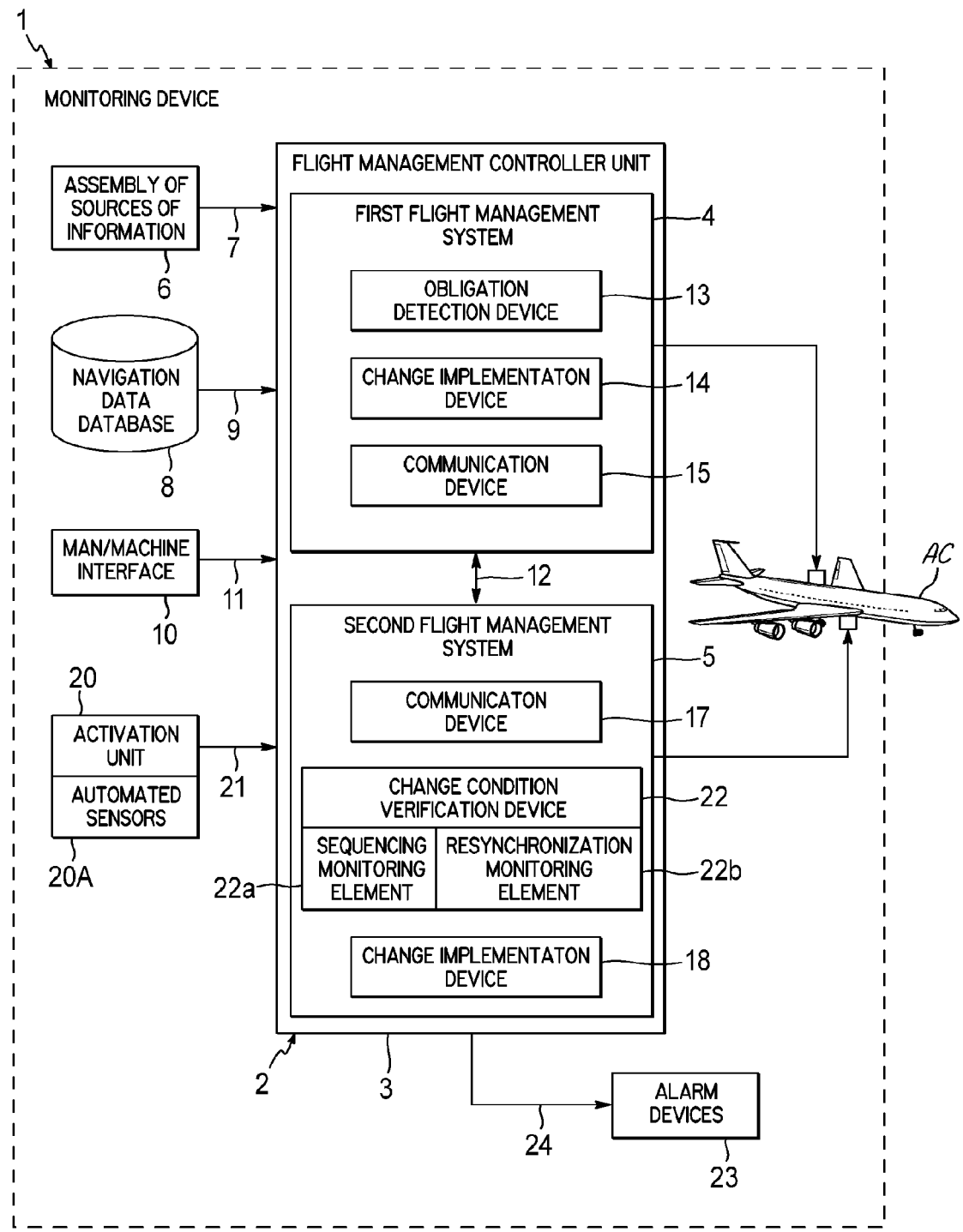

METHOD AND DEVICE FOR AUTOMATICALLY MONITORING AIR OPERATIONS REQUIRING NAVIGATION AND GUIDANCE PERFORMANCE

TECHNICAL FIELD

The present invention relates to a method and a device for automatically monitoring a flight management assembly for an aircraft, in particular for a transport airplane, implementing air operations requiring navigation and guidance performance.

Although not exclusively, the present invention more particularly applies to required navigation performance operations with authorization required, of the Required Navigation Performance with Authorization Required ("RNP AR") type. These RNP AR operations are based on a surface navigation of the aRea NAVigation ("RNAV") type and on operations with required navigation performance of the Required Navigation Performance ("RNP") type. They have the feature of requiring a special authorization for being able to be implemented on an aircraft.

BACKGROUND

The surface navigation of the RNAV type allows an aircraft to fly from a waypoint to another waypoint, and no longer from ground stations (of radio-navigation devices of the NAVAID type) to ground stations.

It is known that the RNP concept corresponds to a surface navigation, for which there are added (on board the aircraft) monitoring and warning devices allowing to ensure that the aircraft remains in a so-called RNP corridor, around a reference trajectory and authorizing taking into consideration curved trajectories. Outside this corridor, there is potentially some relief or other aircrafts. The required performance for a RNP operation type is defined by a RNP value accounting for half the width (in nautical miles: NM) of the corridor around the reference trajectory, where the aircraft should remain 95% of the time during the operation. A second corridor (around the reference trajectory) having half its width twice the RNP value is also defined. The probability that the aircraft goes out of this second corridor should be lower than $10^{-7}$ per hour of flight.

The concept of RNP AR operations is even more stringent. The RNP AR procedures are, indeed characterized by:
RNP values:
being lower than or equal to 0.3 NM in approach, and able to go down to 0.1 NM; and
being strictly lower than 1 NM at start and upon re-throttling and also able to go down to 0.1 NM;
a final approach segment that could be curved; and
obstacles (mountains, traffic . . . ) that could be located at twice the RNP value with respect to the reference trajectory, while for usual RNP operations, an additional margin with respect to obstacles is provided.

The air authorities have defined a Target Level of Safety ("TLS") of $10^{-7}$ per operation, whatever the type. In the case of RNP AR operations, as the RNP values could go down to 0.1 NM and the obstacles could be located at twice the RNP value of the reference trajectory, this objective results in a probability that the aircraft goes out of the corridor with half a width D=2.RNP that should not exceed $10^{-7}$ per procedure.

The equipment embedded on board aircrafts (flight management system, inertial unit, means for updating GPS data and means for guiding the autopilot), as well as the usual architecture, does not allow to reach the target level of safety, if mitigation operational means are not provided, including for the detection and the management of possible breakdowns. This is why a special authorization is required for this type of operation, so as to ensure that the operational procedures and the training of pilots allow to reach the target level of safety. Moreover, as the crew should manage some breakdowns, aircrafts are not able to-day to guarantee a RNP value of 0.1 NM upon a breakdown, as the crew are not able to meet the performance requirements in the autopilot mode.

On current aircrafts, monitoring RNP AR operations is implemented via two usual functions, that is:
a first function monitoring the accuracy and the integrity of the position calculation:
the accuracy of the position is compared to once the RNP value;
the integrity is compared to twice the RNP value; and
if one of the two parameters, accuracy or integrity, exceeds the allotted threshold, a warning is emitted and the crew should take appropriate actions; and
a second function allowing the crew to monitor the guidance of the aircraft:
lateral and vertical deviations of the aircraft with respect to the reference trajectory are displayed and presented to the crew;
the crew monitors the deviations with respect to the budgets allotted for each deflection. If the crew detect an excessive deviation, they should manage the aircraft and initiate adequate correcting actions.

As set forth previously, current aircrafts are not able to guarantee a RNP value of 0.1 NM upon a breakdown and the crew should be specially trained for flying RNP AR procedures. The crew should, indeed, be able to, adequately, detect and process, the breakdowns being able to compromise the ongoing operation.

The objective for future aircrafts involves having the ability to fly RNP AR procedures with RNP values up to 0.1 NM, and this without restriction (in a normal situation and in the case of a breakdown), in a starting, approach and throttling up mode. To this end, the crew should no longer be primarily relied upon for detecting and processing breakdowns.

Now, a flight management assembly, of the Flight Management System ("FMS") type, being responsible for managing the flight plan, the calculation of the trajectory and of deviations/guidance orders nominally operates with two flight management systems, operating in dual mode. In this cooperative nominal operating mode, one of the flight management systems is considered as the master, and it imposes to the other, being considered as the slave, to implement some operations in particular at the level of the management of the flight plan so as to allow the slope system to remain synchronized to said master system. Among these operations, are included, in particular, requests for segmenting the trajectory so that the two flight management systems remain synchronized and are able to provide consistent information to the crew.

Now, in a context of air operations requiring navigation and guidance performance, the lateral trajectory is a critical data, as it has a direct impact on the guidance of the aircraft and on the keeping of the protective corridor with respect to obstacles. Via the dual mode operating, an erroneous piece of information from the system could corrupt the slave system without any problem being detected, neither by the systems, nor by the crew. If an erroneous piece of information leads the master system to sequence its lateral flight plan when that is unnecessary, the master system will impose such sequencing to the slave system. Thus, the erroneous sequencing will be carried out consistently and nearly simultaneously by the two flight management systems.

Such an operating mode is therefore not compatible with carrying out air operations requiring navigation and guidance performance.

SUMMARY OF THE INVENTION

The present invention aims at solving the above mentioned drawbacks. It relates to a method for automatically monitoring a flight management assembly for an aircraft implementing air operations requiring navigation and guidance performance. The present invention applies to a flight management assembly comprising a first flight management system, of the master type, operating in dual mode with a second flight management system, of the slave type, and that, upon the detection of an obligation for implementing an operation affecting its flight plan, emits, toward said second flight management system, a request asking to carry out at least one operation affecting the flight plan of the latter.

To this end, according to this invention, said method for automatically monitoring a flight management assembly, is remarkable, if said method is activated, upon the emission of such a request, the following operations are implemented consisting in:
  a) checking that the conditions for implementing said request are met; and
  b) as a function of this check:
    if said conditions are met, said second flight management system carries out the operation requested by this request; and
    if said conditions are not met, said second flight management system does not carry out the operation requested by this request, and a warning signal is emitted.

In addition, preferably, at step b):
  if said conditions are met, the two flight management systems continue to operate in dual mode; and
  if said conditions are not met, the two flight management systems will operate in an independent mode.

Thus, thanks to the invention, it is checked whether the necessary conditions (to be set forth below) are met for implementing a request emitted by a first system (for flight management), of the master type, operating in dual mode with a second system (for flight management) of the slave type. And said second flight management system carries out the operation requested by such a request only if said conditions are indeed met.

Moreover, when said conditions are not met, the crew are made aware of the situation thru the emission of a warning signal, and preferably, the two flight management systems are led to operate in an independent mode.

Consequently, the present invention provides a simple breakdown resistant solution, so that a usual dual operating mode, to which this solution is applied, becomes compatible with carrying out air operations requiring navigation and guidance performance.

In a first embodiment, said request is a request for sequencing the flight plan. This invention allows checking whether this request should be carried out or not, whatever the checking conditions (remote, time or geometric). In a particular mode, said request for sequencing the flight plan results from a calculation error of the position of the aircraft. In this case, advantageously, upon the emission of such a sequencing request, at step a):

the difference is calculated between the positions of the aircraft, available respectively to the two flight management systems;
said difference is compared with a threshold value; and
as a function of this comparison, it is considered:
  that the conditions for implementing said request are met, if this difference is lower than said threshold value; and
  that the conditions for implementing said request are not met, if this difference is higher than or equal to said threshold value.

Moreover, advantageously, if the conditions for implementing said request are not met, said second flight management system does not sequence its flight plan.

Moreover, in a second embodiment, said request is a resynchronization request, relative to a modification of the flight plan or to a difference of flight plan between the first and second flight management systems. In such a case, advantageously, in a first alternative embodiment, after inserting in the flight plan a procedure relative to air operations requiring navigation and guidance performance, upon the preparation of an approach phase, if a resynchronization request, relative to a modification of the flight plan, is emitted, at step a) for checking whether the conditions for implementing said request are met, it is checked whether the new flight plan is consistent with the ongoing procedure, such as issued from a navigation data base.

Moreover, advantageously, in a second alternative embodiment, upon an approach phase, wherein a procedure relative to air operations requiring navigation and guidance performance is implemented, if a resynchronization request, relative to a modification of the flight plan, is emitted, at step a) for checking whether the conditions for implementing said request are met, it is checked whether the new novel flight plan is consistent with the ongoing procedure, such as issued from a navigation data base.

It is noticed that the present invention is applicable to an approach procedure and to a departure procedure.

Furthermore, the monitoring step a) is preferably implemented using devices that are part of said second flight management system (slave system). However, it could also be contemplated implementing step a) using devices external to said second flight management system, for example, devices of said master system or of another system or equipment of the aircraft.

Furthermore, the activation of the operations carried out at steps a) and b) could be implemented:
  automatically, preferably as a function of the configuration of the aircraft and current flight data; and/or
  manually by an operator, using a man/machine interface.

The present invention relates also to a device for automatically monitoring a flight management assembly, such as mentioned hereinabove, of an aircraft implementing air operations requiring navigation and guidance performance.

According to this invention, said device is remarkable in that it comprises:
  means for activating said device;
  means for checking, upon the emission of a request (requesting to carry out at least one operation affecting the flight, that the conditions for implementing said request are met;
  means ordering the second flight management system to carry out the operation requested by this request, if said conditions are met;
  means ordering said second flight management system not to carry out the operation as requested by the request, if said conditions are not met; and means for emitting a warning signal, if said conditions are not met.

Additionally, in a preferred embodiment, said device further comprises at least one navigation database used for the above mentioned check. Preferably, each flight management system comprises its own database.

Monitoring according to the invention is particularly adapted for the RNP context, but could also apply to any flight requiring a high level of integrity, of resistance to breakdowns and of monitoring, for following a flight plan. Such a monitoring thus provides:

means for monitoring orders imposed by the master system to the slave system; and particular operating logics, when inconsistencies are detected between the master system and the slave system.

The present invention also relates to:

a flight management assembly for an aircraft implementing air operations requiring navigation and guidance performance, said assembly comprising a first flight management system, of the master type, and a second flight management system, of the slave type, operating in dual mode, as well as a monitoring device, such as mentioned hereinabove. Preferably, said flight management assembly is symmetric, each of said flight management systems being able to play the part of the master (or of the slave) knowing that at a given instant, there is only one master and one slave; and/or an aircraft, in particular a transport airplane, being provided with such a flight management assembly and/or such a monitoring device.

BRIEF DESCRIPTION OF THE DRAWINGS

The single FIG. of the appended drawing will better explain how this invention can be implemented. This single FIG. is the block diagram of a flight management assembly, comprising a device according to this invention.

DETAILED DESCRIPTION

The monitoring device 1 according to this invention and schematically shown on the single FIG. is intended for automatically checking a flight management assembly 2 for an aircraft (AC), in particular a transport airplane, being able to implement air operations requiring navigation and guidance performance.

Said flight management assembly 2 being responsible, usually, for managing the flight plan, the calculation of the trajectory and deviations/guidance orders, comprises, amongst others, one flight management controller unit 3 comprising:

one first flight management system 4, being considered as the master; and one second flight management system 5, being considered as the slave, both being of the FMS type.

Preferably, said flight management assembly 2 is symmetric, each of said flight management systems 4, 5 being able to play the part of the master (or of the slave) knowing that at a given instant, there is only one master and one slave.

Said flight management assembly 2 also comprises:

an assembly 6 of sources of information, being connected via a link 7 to said flight management controller unit 3 and providing, amongst others, usually, the flight plan of the aircraft, as well as the current values of parameters relative to the flight of the aircraft and to its environment;

a navigation data database 8 being connected via a link 9 to said flight management controller unit 3 and containing navigation data and information relative to a RNP procedure; and a man/machine interface 10 being connected via a link 11 to said unit 3.

Said flight management systems 4 and 5 being connected together via a link 12 so as to operate in dual mode. To this end, said first flight management system 4 comprises an obligation detection device 13 being able to detect an obligation for implementing an operation affecting the flight plan of said system 4;

a change implementation device 14 for implementing the operation affecting the flight plan, upon a detection by the obligation detection device 13; and a communication device 15 for emitting to said system 5, a request requesting the latter to carry out at least one operation affecting the flight plan plane of said system 5, in the case of the detection by the obligation detection device 13 of an obligation to implement an operation such as mentioned hereinabove.

Moreover, said second flight management system 5 comprises:

a communication device 17 intended for receiving a request emitted by the communication device 15; and a change implementation device 18 for implementing the operation requested by a request.

The present invention relates to a monitoring device 1 for automatically monitoring the flight management assembly 2 of the aircraft implementing air operations requiring navigation and guidance performance.

According to this invention, said monitoring device 1 comprises:

an activation unit 20 for activating said monitoring device 1, being, for example, connected via a link 21 to the flight management controller unit 3;

a change condition verification device 22:

for checking, upon the emission of a request (requesting to carry out at least one operation affecting the flight plan, that the conditions for implementing said request are met; and for ordering said second flight management system 5:

to carry out the operation requested by this request, if said conditions are met; and not to carry out the operation requested by this request, if said conditions are not met; and alarm devices 23 being, for example, connected via a link 24 to said flight management controller unit 3 and being formed so to emit a warning signal, if said conditions are not met.

Said alarm devices 23 are formed, preferably, so as to emit at least one (visual or sound) warning in the cockpit of the aircraft.

The usual operation of a dual mode being not acceptable in a context of operations requiring navigation and guidance performance, as a breakdown of the master system could be automatically propagated to the slave system without the crew are able to detect it, a monitoring is thus initiated, within the context of present invention, preferably at the level of the slave system 5, with the aim to check the requests sent by the master system 4, for any erroneous piece of information able to impact the lateral trajectory or the associated guidance.

Thus, the monitoring device 1 according to this invention allows to check whether the necessary conditions are met for implementing a request emitted by the master system 4, operating in dual mode with the slave system 5. And said slave system 5 carries out the operation requested by this request only if said conditions are indeed met.

Furthermore, when said conditions are not met, the crew are warned by the warning alarm devices 23 thanks to the emission of a corresponding warning signal in the cockpit of the aircraft.

Moreover, preferably, in this case, said device 1 makes the two flight management systems 4 and 5 operate in an independent mode, replacing the dual mode used until then.

Consequently, the present invention provides a simple breakdown resistant solution, so that a usual dual operating mode, to which this solution is applied, becomes compatible with carrying out air operations requiring navigation and guidance performance.

For achieving such an objective, two monitoring elements (being part of change condition verification device 22) could be initiated between the master system 4 and the slave system 5, that is:
- a sequencing monitoring element 22a for monitoring the sequencing of the trajectory; and
- a resynchronization monitoring element 22b for monitoring resynchronizations of the slave system 5 on the master system 4.

These two monitoring elements 22a, 22b allow to check the management of the lateral trajectory and to protect the flight plan of each flight management system 4, 5. Without requiring any action from the crew, these elements 22a, 22b allow to permanently guarantee the independence of the two flight management systems 4 and 5 even in dual mode. Each request from the master system 4 is checked by the slave system 5 able to take it into consideration only if it has the ability to do so. In case of mismatch, the crew are warned and the operation mode could be degraded (switching from the dual mode to the independent mode).

In order to limit the exposure time of these two elements 22a, 22b, they only apply to RNP AR procedures referred to as Low RNP, that is to the procedures for which the current value of RNP is lower than or equal to 0.3 mm. The activation of these elements 22a, 22b is, in this case, automatic and does not require any action from the crew.

Within the context of the present invention, the activation of said monitoring device 1 could be implemented:
- automatically, preferably as a function of the configuration of the aircraft and of current flight data, by automated sensors 20a being part of activation unit 20. In particular, the activation could be implemented before the aircraft enters in a RNP AR procedure, in order to check that the two flight management systems 4 and 5 are in an adequate configuration and to warn the crew if this is not the case; and/or
- manually by an operator, by a device of a man/machine interface such as at 10, or alternatively, being part of the activation unit 20, preferably using a screen page allowing the crew to interact with the assembly 2.

In a first embodiment, said request is a request for sequencing the flight plan. This invention allows to check whether this request should be carried out or not, whatever the checking conditions (remote, time or geometric). Preferably, said request for sequencing the flight plan results from a calculation error of the position of the aircraft. In this case, upon the emission of such a sequencing request by the communication device 15, the change condition verification device 22 implements the following operations, using the appropriate sequencing monitoring element 22a:
- calculating the difference between the positions of the aircraft, available respectively to the two flight management systems 4 and 5;
- comparing this difference to a predetermined threshold value; and
- as a function of this comparison, considering:
  - that the conditions for implementing said request are met, if this difference is lower than said threshold value; and
  - that the conditions for implementing said request are not met, if this difference is higher than or equal to said threshold value.

Moreover, if the conditions for implementing said request are not met, said slave system 5 does not sequence its flight plan.

This first embodiment corresponds to the following situation. The crew fly a RNP AR procedure, in automatic modes (slaving of the aircraft on its lateral, vertical trajectory and in speed), and the RNP monitoring are active. The operation of the aircraft and of the systems involved in the monitoring is nominal. On the pilot's side, a calculation error of the position of the aircraft occurs. Whatever its cause, this breakdown leads the master system 4 (being on this side) to lie in conditions authorizing to sequence the next passage point of the flight plan. It sends (using communication device 15) a sequencing request to the slave system 5, in accordance with the dual operating mode. Two situations may then occur:
- either the slave system 5 also lies in the sequencing conditions (low difference of position between the two systems 4 and 5), and in this case, no problem is detected and:
  - the master system 4 carries out the sequencing; and
  - the slave system 5 accepts the request from the master system 4 and sequences its flight plan;
- or the slave system 5 does not lie in the sequencing conditions, and a conflict is then detected between the two systems 4 and 5 and:
  - the master system 4 carries out the sequencing; but
  - the slave system 5 does not accept the request from the master system 4 and does not sequence its flight plan.

In the first situation, the two systems 4 and 5 remain synchronized, and they continue to collaborate in dual mode.

On the contrary, in the second situation, the two systems 4 and 5 cannot remain synchronized (the flight plan being different), and the dual mode is replaced by the independent mode. There is no longer any communication between the two systems 4 and 5. The master system 4 does not impose anything to the slave system 5. This switch to an independent mode is detected by the other systems involved in RNP monitoring, resulting in reconfigurations in the cockpit, being visible for the crew.

Moreover, in a second embodiment, said request is a resynchronization request, relative to a modification of the flight plan or to a difference of flight plan (between both sides of the aircraft).

In such a case, two situations should be distinguished.

In a first situation relative to a first alternative embodiment, after the insertion in the flight plan of a procedure relative to air operations requiring navigation and guidance performance, upon the preparation of an approach phase, if a resynchronization request (relative to a modification of the flight plan) is emitted by the communication device 15, the change condition verification device 22 check whether the new flight plan is consistent with the ongoing procedure, such as issued from the navigation database 8, by using the resynchronization device 22b.

In this situation, the aircraft is flying, typically in a cruising phase, and the crew prepares the approach of a runway of an airport with a view to landing, inserting in the flight plan a RNP AR procedure. After this procedure has been inserted, a breakdown induces a modification in the flight plan of the master system 4. There is thus an inconsistency between the flight plan of the two systems 4 and 5. Such an inconsistency is not detectable by the crew, but it affects the RNP AR procedure. In accordance with the dual operating mode, the master system 4 sends a resynchronization order to the slave system 5 requesting it to delete its own flight plan and to become reinitialized with the data from the master system 4. The slave system 5 receives the new flight plan, detects the presence of a RNP AR procedure and compares it with the RNP AR procedure being located in the navigation database 8. Given the initial breakdown that has affected the flight plan of the master system 4, the change condition verification device 22 of the slave system detect an inconsistency between this new flight plan and the procedure issued from the database 8. The slave system 5 rejects the resynchronization, and a warning message is emitted by the alarm devices 23, for warning the crew, so that they become aware of the problem before initiating a RNP AR procedure. Consequently, the crew have had the time to recharge the RNP procedure in the systems 4 and 5 and to ensure that the flight plan are in accordance.

In a second situation relative to a second alternative embodiment, upon an approach phase of a runway of an airport with a view to landing, wherein a procedure relative to air operations requiring navigation and guidance performance is implemented, if a resynchronization request (relative to a modification of the flight plan) is emitted by the communication device 15, the change condition verification device 22 check whether the new flight plan is consistent with the ongoing procedure, such as issued from the navigation database 8, by using the resynchronization device 22b.

In this second situation, the aircraft is flying, typically in an approach phase, and flies according to a RNP AR procedure. A breakdown induces an error in the flight plan (and thus in the ongoing RNP AR procedure) of the master system 4. As in the previous case, an inconsistency is detected between the two systems 4 and 5, and the master system 4 requests the slave system 5 to become resynchronized on it. The slave system 5 receives this request and the new flight plan. It detects, using the monitoring change condition verification device 22, the inconsistency with the RNP AR procedure lying in the database 8. It rejects the resynchronization and the communication between the two systems 4 and 5, and the dual mode is then given up to the profit of the independent mode, allowing to avoid the erroneous piece of information from being propagated from the master system 4 to the slave system 5. This independent operating mode is maintained and blocks the synchronization as long as the aircraft flies according to this RNP AR procedure.

The present invention could apply to an approach procedure, as described previously, but also to a departure procedure.

The architecture and the different monitoring functions, as described above, allow the aircraft to meet the safety requirements inherent to RNP AR operations, being able to detect and to identify automatically a defective system. The crew could further follow and monitor whether the operation is properly carried out.

The present invention is adapted to air operations of the RNP type, but it could also be used for any flight requiring a high level of integrity, of resistance to breakdowns and of monitoring, for following a flight plan. For example, it may be employed for operations in a mountain environment, for which RNP procedures would not have been created.

Furthermore, the monitoring according to the invention is implemented using change condition verification device 22 being part, preferably, of said second flight management system 5 (slave system). However, it could also be contemplated to implement the monitoring using a device being external to said slave system 5, for example, a device being part of said master system 4 or of another system of the aircraft.

The invention claimed is:

1. A method for operating and automatically monitoring a flight management assembly for an aircraft implementing air operations requiring navigation and guidance performance, the flight management assembly comprising a first flight management system and a second flight management system, and the method comprising:
   operating the first and second flight management systems in dual mode so that the first flight management system acts as a master system and the second flight management system acts as a slave system with intercommunication between the master and slave systems,
   detecting, with an obligation detection device of the first flight management system, an obligation to implement an operation affecting a flight plan of the first flight management system,
   emitting a request, with a communication device of the first flight management system, to the second flight management system, the request requiring to carry out at least one operation affecting the flight plan of the second flight management system,
   upon emitting the request, checking, with a change condition verification device operatively coupled to the second flight management system, that conditions for implementing the request are met; and
   performing one of the following operations, with a change implementation device of the second flight management system, as a function of the checking step:
      if the conditions are met, implementing the request at the second flight management system and the first and second flight management systems thereby continue to operate in dual mode with the first flight management system acting as the master system and communicating with the second flight management system acting as the slave system; or
      if the conditions are not met, blocking implementation of the request at the second flight management system, such that the first and second flight management systems will operate in an independent mode in which the first and second flight management systems do not operate as master and slave systems with intercommunication between the master and slave systems, and emitting a warning signal with alarm devices to notify a crew of the aircraft regarding the independent mode of operation being used.

2. The method according to claim 1, wherein the change condition verification device includes a sequencing monitoring element, the request is a request for sequencing the flight plan of the second flight management system, as a result of a calculation error of a position of the aircraft, and the checking step further comprises:
   calculating, with the sequencing monitoring element, a difference between positions of the aircraft, used by and available respectively to the first and second flight management systems;
   comparing, with the sequencing monitoring element, the difference with a threshold value; and
   one of the following:
      verifying that the conditions for implementing the request are met, if the difference is lower than the threshold value; and verifying that the conditions for implementing the request are not met, if the difference is higher than or equal to the threshold value.

3. The method according to claim 2, wherein after verifying that the conditions for implementing the request are not met, the method further comprises:
blocking a sequencing of the flight plan of the second flight management system.

4. The method according to claim 1, wherein the request is a request to resynchronize the flight plan of the second flight management system to a new flight plan of the first flight management system, and the checking step further comprises, after insertion in the new flight plan of the first flight management system of a procedure relative to air operations requiring navigation and guidance performance, and thereby upon the preparation of an approach phase:
comparing, with the change condition verification device, whether the new flight plan of the first flight management system is consistent with an ongoing procedure, issued from a navigation data database communicating with the flight management assembly.

5. The method according to claim 1, wherein the request is a request to resynchronize the flight plan of the second flight management system to a new flight plan of the first flight management system, and the checking step further comprises, upon an approach phase, wherein a procedure relative to air operations requiring navigation and guidance performance is implemented:
comparing, with the change condition verification device, whether the new flight plan of the first flight management system is consistent with an ongoing procedure, issued from a navigation data database communicating with the flight management assembly.

6. The method according to claim 1, wherein the change condition verification device is incorporated as a part of the second flight management system.

7. The method according to claim 1, wherein the change condition verification device is external to the second flight management system.

8. The method according to claim 1, further comprising:
automatically activating, with an activation unit operatively coupled to the flight management assembly, the checking and performing steps.

9. The method according to claim 8, wherein the activation unit automatically activates the checking and performing steps as a function of a configuration of the aircraft and of current flight data.

10. The method according to claim 1, further comprising:
manually activating, with a man/machine interface operatively coupled to the flight management assembly, the checking and performing steps.

11. A device for operating and automatically monitoring a flight management assembly for an aircraft implementing air operations requiring navigation and guidance performance, the flight management assembly comprising a first flight management system and a second flight management system normally operating in dual mode so that the first flight management system acts as a master system and the second flight management system acts as a slave system with intercommunication between the master and slave systems, and, in the case of a detection of an obligation to implement an operation affecting a flight plan of the first flight management system, the first flight management system is configured to emit, to the second flight management system, a request requesting to carry out at least one operation affecting the flight plan of the second flight management system, the device comprising:

an activation unit that activates the device when the first and second flight management systems are operating in dual mode;
a change condition verification device that checks, upon the emission of the request from the first flight management system, that conditions for implementing the request are met, wherein the change condition verification device orders the second flight management system to carry out the operation requested by the request if the conditions are met, such that the two flight management systems continue to operate in dual mode with the first flight management system acting as master system and communicating with the second flight management system acting as slave system, and wherein the change condition verification device orders the second flight management system not to carry out the operation requested by the request if the conditions are not met, the two flight management systems then operating in an independent mode in which the first and second flight management systems do not operate as master and slave systems with intercommunication between the master and slave systems; and
alarm devices that emit a warning signal, if the conditions are not met, to notify a crew of the aircraft regarding the independent mode of operation being used.

12. The device according to claim 11, further comprising:
at least one navigation data database communicating with the change condition verification device and used for the check that the conditions for implementing the request are met.

13. The device according to claim 11, further comprising:
a flight management controller unit operatively coupled to the activation unit and the alarm devices, the flight management controller including the first flight management system, of the master type, and the second flight management system, of the slave type.

14. The aircraft according to claim 11, further comprising:
a flight management controller unit operatively coupled to the activation unit and the alarm devices, the flight management controller including the first flight management system, of the master type, and the second flight management system, of the slave type.

15. The aircraft according to claim 14, wherein the change condition verification device further comprises:
a sequencing monitoring element that calculates a difference between positions of the aircraft used by the first and second flight management systems and compares the difference to a threshold value to determine if the conditions for implementing the request are met.

16. The aircraft according to claim 14, wherein the change condition verification device further comprises:
a resynchronization monitoring element that compares a new flight plan generated by the first flight management system to an ongoing procedure to determine if the conditions for implementing the request are met.

17. The aircraft according to claim 14, wherein the change condition verification device is incorporated as a component of the second flight management system.

18. The aircraft according to claim 14, wherein the change condition verification device is external to the second flight management system.

19. An aircraft, comprising:
a device for operating and automatically monitoring a flight management assembly for an aircraft implementing air operations requiring navigation and guidance performance, the flight management assembly comprising a first flight management system and a second flight management system normally operating in dual mode so that the first flight management system acts as a master system and the second flight management system acts as a slave system with intercommunication between the master and slave systems and, in the case of a detection of an obligation to implement an operation affecting a flight plan of the first flight management system, the first flight management system is configured to emit to the second flight management system, a request requesting to carry out at least one operation affecting the flight plan of the second flight management system, the device comprising:

an activation unit that activates the device when the first and second flight management systems are operating in dual mode;

a change condition verification device that checks, upon the emission of the request from the first flight management system, that conditions for implementing the request are met, wherein the change condition verification device orders the second flight management system to carry out the operation requested by the request if the conditions are met, such that the two flight management systems continue to operate in dual mode with the first flight management system acting as master system and communicating with the second flight management system acting as slave system, and wherein the change condition verification device orders the second flight management system not to carry out the operation requested by the request if the conditions are not met, the two flight management systems then operating in an independent mode in which the first and second flight management systems do not operate as master and slave systems with intercommunication between the master and slave systems; and alarm devices that emit a warning signal, if the conditions are not met, to notify a crew of the aircraft regarding the independent mode of operation being used.

20. The aircraft according to claim 19, further comprising:

at least one navigation data database communicating with the change condition verification device and used for the check that the conditions for implementing the request are met.

* * * * *